United States Patent
Perl et al.

(10) Patent No.: US 7,636,702 B2
(45) Date of Patent: Dec. 22, 2009

(54) INTERSECTION ONTOLOGIES FOR ORGANIZING DATA

(75) Inventors: Yehoshua Perl, Forest Hills, NY (US); James Geller, West Orange, NJ (US)

(73) Assignee: New Jersey Institute of Technology, Newark, NJ (US)

(*) Notice: Subject to any disclaimer, the term of this patent is extended or adjusted under 35 U.S.C. 154(b) by 397 days.

(21) Appl. No.: 11/556,073

(22) Filed: Nov. 2, 2006

(65) Prior Publication Data

US 2007/0109018 A1 May 17, 2007

Related U.S. Application Data

(60) Provisional application No. 60/732,869, filed on Nov. 2, 2005.

(51) Int. Cl.
*G06N 5/02* (2006.01)
(52) U.S. Cl. .................. 706/55; 706/45; 706/46; 706/50
(58) Field of Classification Search .......... 706/45–47, 706/50, 55, 61; 707/1–3, 6, 100, 102, 103 X, 707/103 Z
See application file for complete search history.

(56) References Cited

U.S. PATENT DOCUMENTS

| | | | |
|---|---|---|---|
| 6,742,003 B2 * | 5/2004 | Heckerman et al. ...... 707/104.1 |
| 6,976,020 B2 * | 12/2005 | Anthony et al. ................ 707/6 |
| 2004/0117395 A1 * | 6/2004 | Gong et al. .................. 707/101 |
| 2005/0065955 A1 * | 3/2005 | Babikov et al. ............. 707/101 |
| 2005/0235011 A1 * | 10/2005 | Minium et al. .............. 707/203 |
| 2006/0053136 A1 * | 3/2006 | Ashiri ........................ 707/101 |
| 2006/0053151 A1 * | 3/2006 | Gardner et al. ............. 707/102 |
| 2006/0074836 A1 * | 4/2006 | Gardner et al. ................ 706/60 |

* cited by examiner

*Primary Examiner*—David R Vincent
*Assistant Examiner*—Omar F Fernandez Rivas
(74) *Attorney, Agent, or Firm*—Connolly Bove Lodge & Hutz LLP

(57) ABSTRACT

An intersection ontology may comprise a root node, representing an entire data set, and a second "layer" of nodes, groups of which may be used to represent different types of classifications of the data set. The intersection ontology may then contain one or more layers of nodes that may be represented by intersections of two or more of the second-layer nodes, as may be needed according to a desired application (that is, the intersections may be formed, essentially, on demand). There may be a single layer of intersection nodes, or there may be multiple layers of intersection nodes. In a multiple layer embodiment, each intersection node may be represented as an intersection of second-layer nodes and/or intersection nodes.

30 Claims, 9 Drawing Sheets

INTERSECTION ONTOLOGIES FOR ORGANIZING DATA

CROSS-REFERENCE TO RELATED APPLICATION

This application claims the benefit of the filing date of U.S. Provisional Application No. 60/732,869, filed Nov. 2, 2005, commonly-assigned, and incorporated by reference herein in its entirety.

BACKGROUND OF THE INVENTION

1. Field of the Invention

Embodiments of the present invention may relate to the organization of data for various applications. More particularly, embodiments of the invention may relate to the organization of objects or concepts that may be described by multi-dimensional data using ontological techniques.

2. Description of Related Art

Ontologies may be considered as being related to semantic networks in the field of artificial intelligence. Semantic networks and ontologies may be built based on concepts. A concept is a basic unit of knowledge. A concept is unambiguous.

In such structures, concepts may be connected by "links." The most fundamental of these links may describe a generalization/specialization relationship between two concepts, and this relationship satisfies transitivity ("transitivity" refers to the well-known mathematical concept in which, for a binary relation R and elements a, b, and c, if aRb and bRc, then aRc). It has been variously called IS-A, sub-concept, subclass, a-kind-of, etc. This type of link may be used to indicate property inheritance, as in the following example.

Humans have additional "local" information about concepts. For example, solid objects have color, size, etc. We call this kind of local information "attributes", "properties" or "slots". If a general concept has an attribute (vehicles have a weight), then a specific sub-concept will have the same property (cars have a weight). One can conceptualize inheritance as the propagation of a property from the general concept to the more specific concept against the direction of the IS-A link.

Besides the IS-A links, ontologies may contain other links, e.g., likes, owns, connected-to, etc. These additional links may have no "built-in behavior". These links are variously called associative relationships, roles, semantic relationships, etc., and may be labeled by their names. Such relationships are inherited down along IS-A links.

Because a concept cannot be more general than itself, and because of the transitivity of the IS-A links, there cannot be any cycles of IS-A links in a semantic network. Furthermore, it is practical to have one concept (often called THING) that is a generalization of every concept in an ontology. Thus, the concepts and IS-A links in an ontology form a hierarchy with a root. In other words, the hierarchy of an ontology may be thought of as a rooted directed acyclic graph (DAG), where the nodes represent the concepts and the links represent IS-A relationships.

The above gives rise to a representation of ontologies in the form of graphs. FIG. 1 shows an example of a graphical representation of an ontology. In this and later figures, every box stands for a concept. Bold arrows (typically pointing upwards) stand for IS-A relationships. Thin arrows will be used to stand for other relationships. The IS-A relationships in this example form a tree. Family terms, such as child, ancestor and descendant, may be used in describing ontologies. A number of other extensions exist for ontologies, such as, but not limited to, rules or axioms.

Thus, one may consider an ontology as follows. An ontology may be considered as a directed graph of nodes, which may be used to represent concepts, and edges, which may be used to represent IS-A and/or semantic relationships between pairs of nodes. Concepts may be labeled by unique terms. Concepts may have additional (name, value) pairs, called attributes, where the attribute name may be unique for each concept. The set of all concepts together with the set of all IS-A links form a rooted, connected, directed acyclic subgraph of the ontology. This subgraph may be referred to as the taxonomy of the ontology. Both attributes and semantic relationships may be inherited downwards, against the direction of the IS-A links, from more general concepts to more specific concepts.

Problems of how to organize data in a succinct, useful manner exist in many fields. One example of this is in marketing. Suppose that there is a large database of customers. One example of how this may be obtained would be by extracting information from the home pages of individual Web users. Such a database may contain demographic information and interests of each customer. This may be created, for example, by mining interest data associated with each customer. The demographic and interest information may be processed with a data mining algorithm to derive association rules between classifications of customers and interests. However, the resulting data may be in a format that does not provide useful information for a marketing professional.

Similar problematic situations may arise in other fields, for example, but not limited to, bioinformatics, computer-aided diagnosis, environmental studies, using census data, etc.

SUMMARY OF THE INVENTION

Various embodiments of the invention may employ what may be termed an "intersection ontology" to organize sets of data into forms that are more easily usable. Such an intersection ontology may comprise a root node, representing the entire data set, and a second "layer" of nodes, which may be referred to as "option nodes," groups of which may be used to represent different types of classifications (which, in an abstract sense, may be thought of as dimensions) of the data set (i.e., a given classification type of the data set may have various options, resulting in various option nodes). The intersection ontology may then contain one or more layers of nodes formed by taking intersections of two or more of the second-layer nodes, as may be needed according to a desired application (that is, the intersections may be formed, essentially, on demand). There may be a single layer of intersection nodes, or there may be multiple layers of intersection nodes. In a multiple layer embodiment, each intersection node may be formed as the intersection of two or more second-layer nodes, one or more second-layer nodes and one or more intersection nodes, or two or more intersection nodes.

In some embodiments of the invention, a method may be used to apply an intersection ontology to a set of data. In other embodiments, a machine-accessible medium may contain instructions to implement a method of applying an intersection ontology to data, or a computer system may be arranged to implement such a method. Similarly, instruction to implement the method may be downloaded from another location.

BRIEF DESCRIPTION OF THE DRAWINGS

Various embodiments of the invention will now be described in conjunction with the attached drawings, in which.

DETAILED DESCRIPTION OF VARIOUS EMBODIMENTS OF THE INVENTION

In the discussion that follows, the example of marketing data, where the concepts being classified are customers, will be used. However, this is an example, only, and the invention should not be understood as being limited to such data.

A straightforward representation of a concept classification, for example, but not limited to, customer classification, is a tree hierarchy. The root may represent the concept PERSON. The various demographic dimensions may be ordered. At each of the levels, one may consider one different demographic dimension according to the above order and branch each node in the previous level to all possible options of this level's dimension. However, there may be problems with this representation, especially in sets of concepts having multiple possible (and useful) ways of being classified.

In the example of marketing, an ontology may comprise a collection of buy-relationships from customer classifications to product classifications. In such a representation, one may wish to show relationships of the form that a specific classification of customers tends to buy a given product or family of products, for example, "married women with children buy toys."

A marketing ontology to accomplish this may comprise two hierarchies, a customer classification hierarchy, in short, customer hierarchy, and a product classification hierarchy, in short, product hierarchy. One may wish to have the group with the classification MARRIED WOMAN WITH CHILDREN (TOY) be identifiable in the customer (product) hierarchy, either as a node or a group of nodes. To achieve a desired succinct representation, one may wish to have a single node for the customer classification concept and a second single node for the product classification concept. Those two nodes may then be connected by a single relationship link with the label "buys," which may then provide an economical representation capturing the desired marketing knowledge for an ontology.

Figure 1:
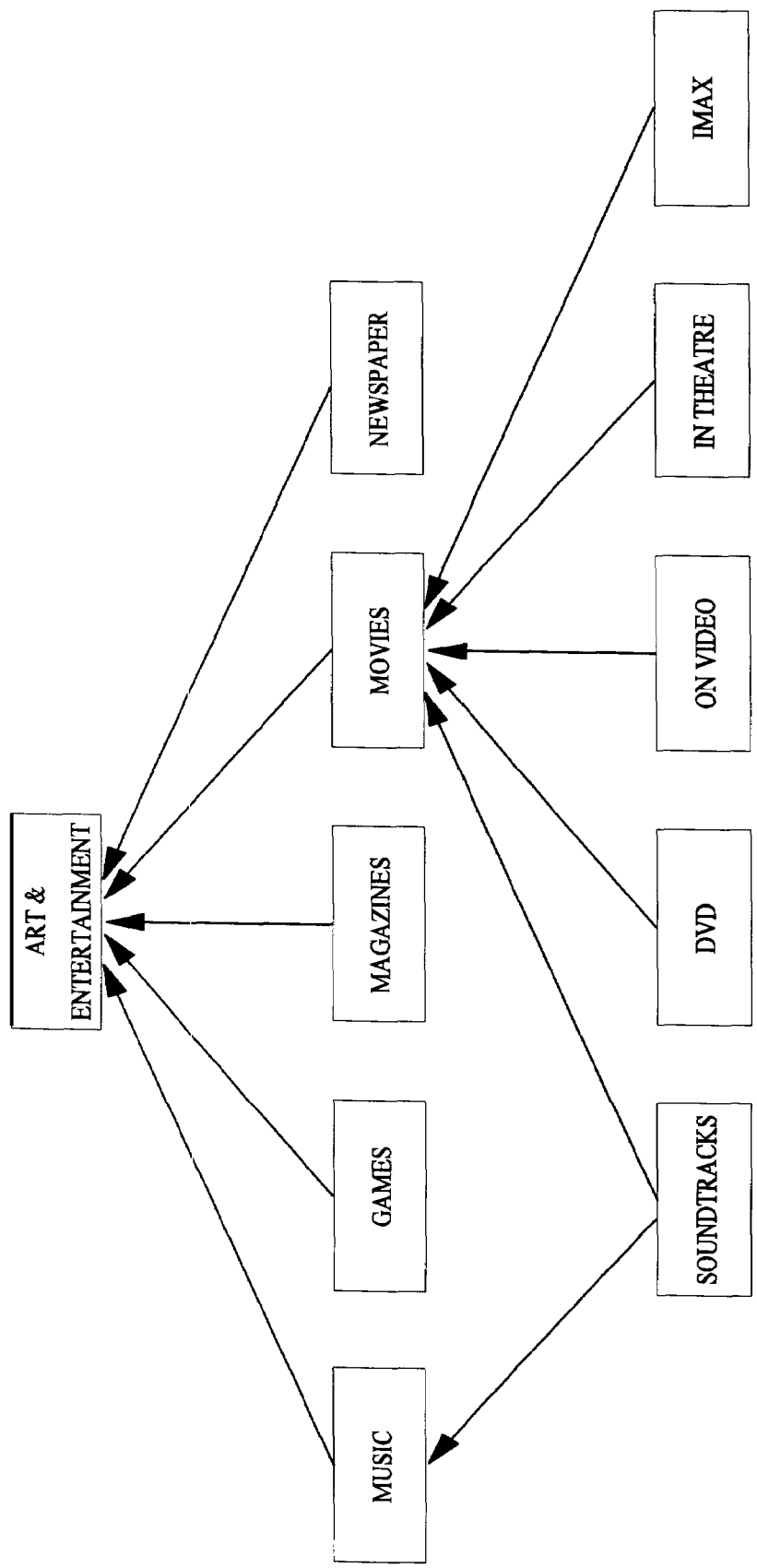
FIG. 1 shows a related art data organization concept.
Figure 2:
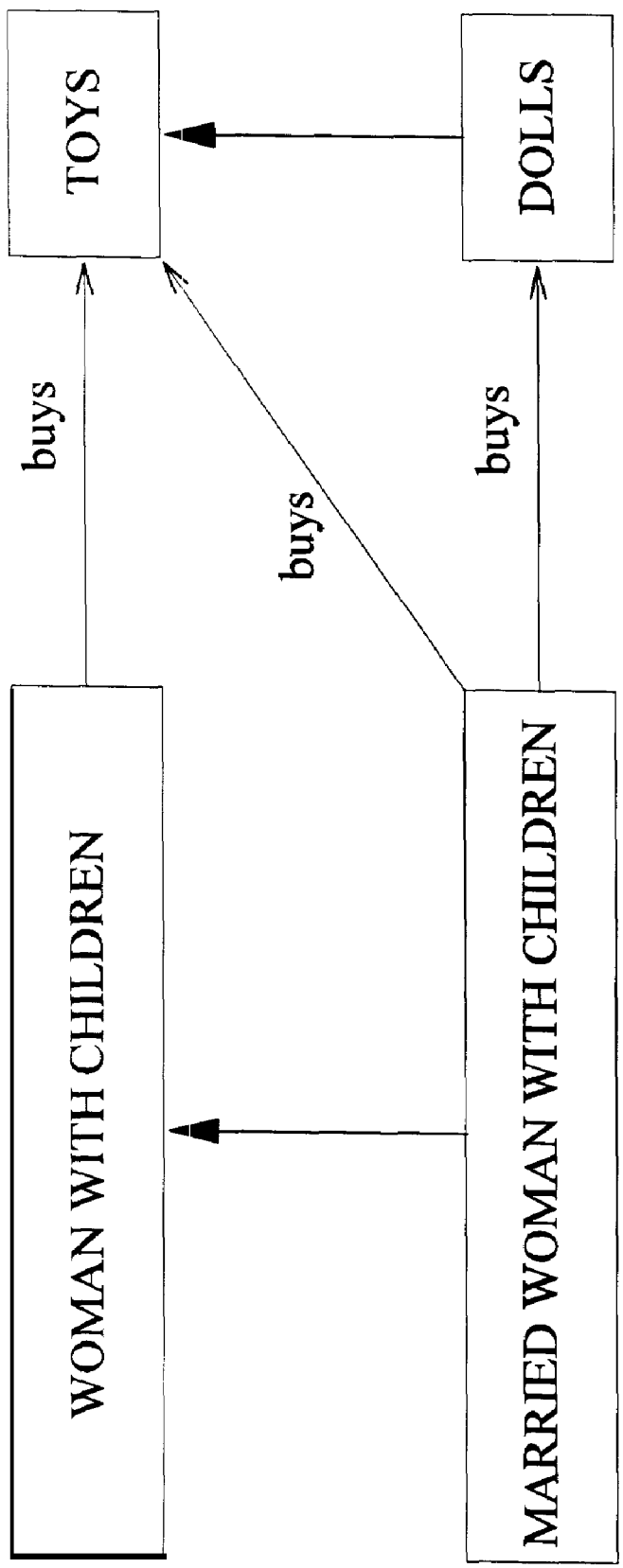
FIGS. 2 and 3 show conceptual examples of how non-intersection ontologies may be applied to a set of data.

FIG. 2 shows an example of a tiny ontology excerpt of four nodes with three "buys" connections. The node, WOMAN WITH CHILDREN, and its child, MARRIED WOMAN WITH CHILDREN, belong to the customer hierarchy. The node, TOY, and its child, DOLL, belong to the product hierarchy. The three connections are labeled "buys." As shown in the example of FIG. 2, the "buys" relationship to TOYs may be inherited from WOMAN WITH CHILDREN to MARRIED WOMAN WITH CHILDREN. The inherited relationship is shown as a dashed arrow (this may not always be shown in diagrams because it can be inferred).

Figure 3:
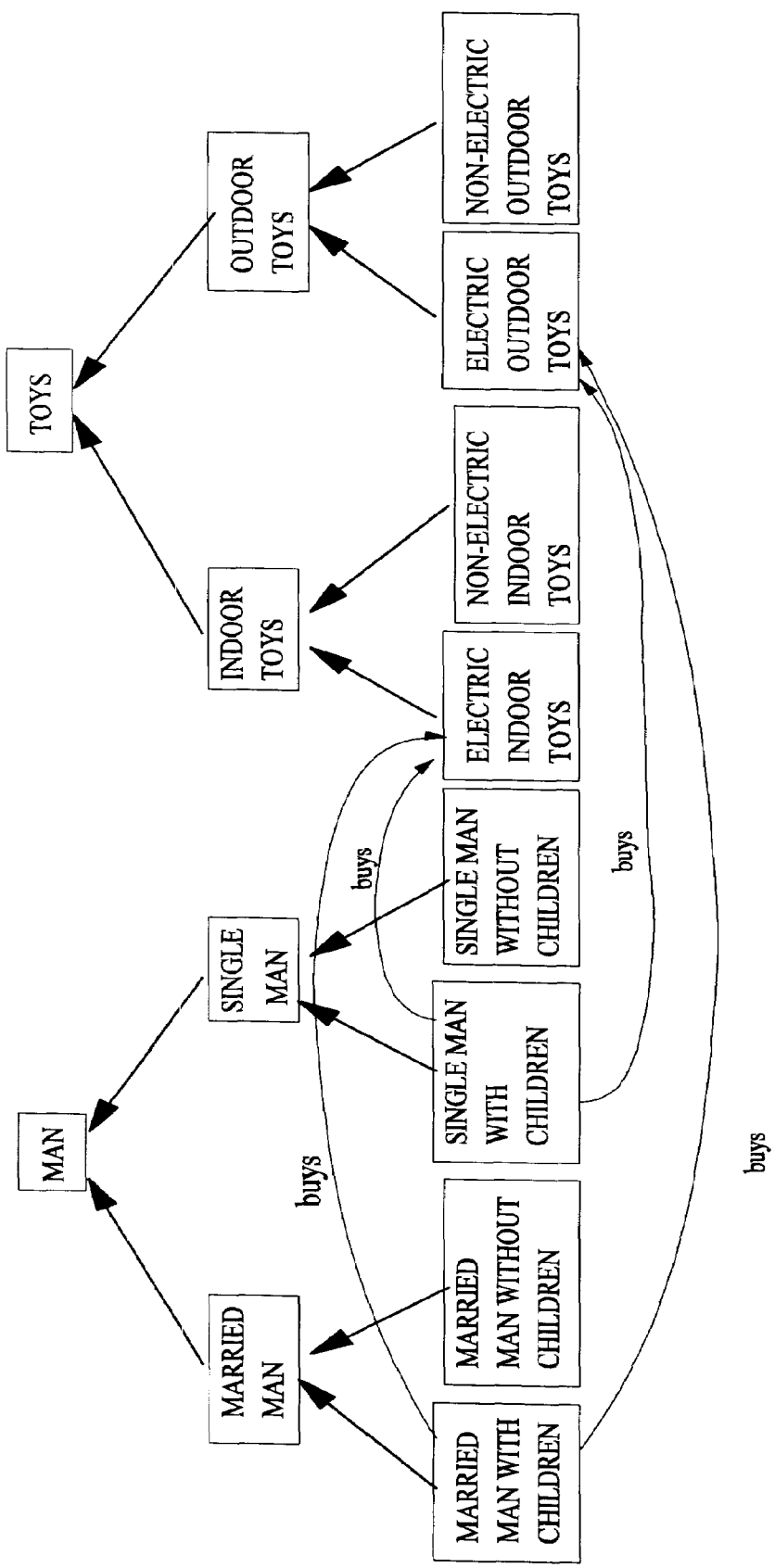

In FIG. 3, however, a more complex example is shown. If the customer classification is represented by k nodes (k>0), and the product classification is represented by l nodes (l>0), then up to k*l "buys" relationships may exist in FIG. 3. One may, therefore, need k*l arrows to express a simple Marketing Fact needed to represent the proper marketing knowledge, which may be less desirable, due to its complexity. FIG. 3 represents a tiny parts of a customer hierarchy and a product hierarchy. For example, in FIG. 3, two nodes are needed to present "men with children" or "electric toys." In such a case, four arrows may then be needed to represent the fact that "men with children buy electric toys."

An alternative way, with nodes representing "men with children" and "electric toys," respectively, with an arrow connecting them may be used to offer a more economical representation for this particular exemplary marketing information. However, if we present ELECTRIC TOYS and NON-ELECTRIC TOYS at level two and the distinction between OUTDOOR and INDOOR at level three, then "men with children buy outdoor toys" requires four arrows. As will be discussed further below, for each sequential ordering of the relevant dimensions, there are some marketing knowledge facts with an uneconomical representation.

In this example of building marketing ontologies, the link with the label "buys" may be used to mean "is likely to buy". Thus, "buys" may be considered to be a statement strictly about a (meaningful) percentage of the population satisfying the demographic data.

For practical utility, however, one may prefer to have a simpler marketing knowledge representation. For example, if data mining indicates that married men with children buy diapers and that married women with children buy diapers, then an assertion that married people with children buy diapers is more economical (as opposed to the separate indications with respect to men and women). That is, one may wish for such information to be attached to exactly the concepts about which one would like to express knowledge. In this example, one would like to associate this knowledge with the concept married people With children, assuming such a concept exists in the ontology.

In customary marketing practice in marketing, one may classify customers along various dimensions, such as gender (man, woman), age (e.g., divided up into age groups), marital status (single, married, separated), children status (with children, no child), etc.

Marketing research may reveal knowledge about buying habits of a customer classified according several dimensions simultaneously. For example, consider the sentence, "Middle-aged married men with children buy books on early childhood development." One may wish to devise a customer hierarchy having a node that corresponds exactly to the above customer classification.

Figures 6A, 6B:
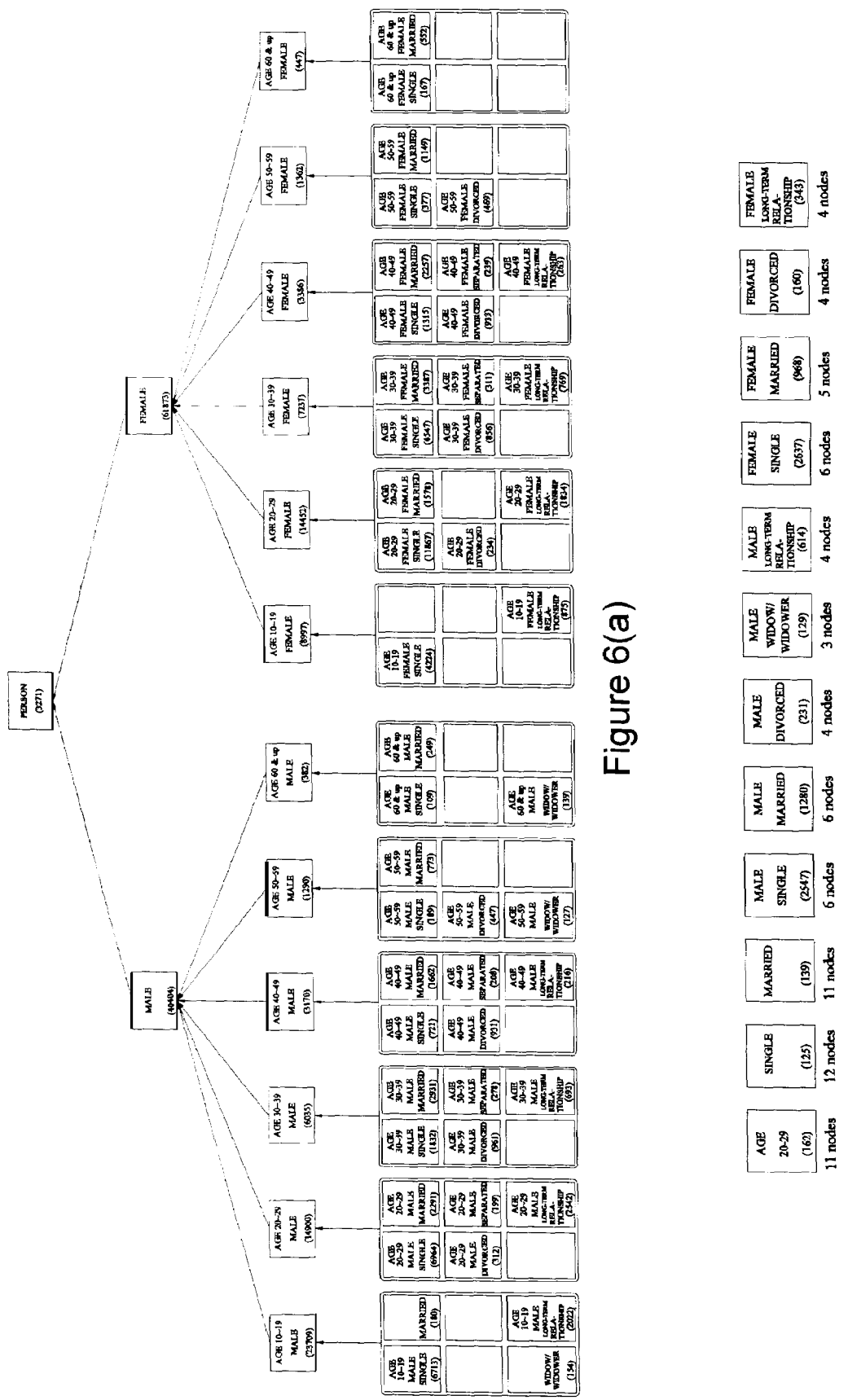
FIGS. 6(a) and 6(b) show a conceptual example of an application of an ontology with ordered dimensions to a set of data.

Consider a tree hierarchy according to the four dimensions listed above, each dimension appearing at a different level of the hierarchy. The tree hierarchy may start with the root node PERSON at level 1. The division into the classifications MAN and WOMAN may then happen at level 2. The division of men (and of women) according to five age groups may then happen at level 3. There is redundancy, however, as the same age choices are made twice, once below MAN and once below WOMAN. The next two levels follow the distinction according to marital status among three options, and children status, respectively. FIG. 6(a) shows how such a tree hierarchy may be shown.

This tree hierarchy, which will be referred to as T, uses a linear ordering of the various dimensions of a customer. In other words, the different dimensions have been somehow prioritized in a particular fashion. The above order of dimensions worked well for the above given example, because the customer class (middle-aged married men with children) was represented by a unique leaf node that may be used as a source for a "buys" relationship to a node representing the product BOOKS ON EARLY CHILDHOOD DEVELOPMENT.

Some marketing knowledge may be attached at a single non-leaf node in the tree hierarchy T. For example, "Men buy football tickets," may be expressed by a relationship that has the second-level node, MAN, as its source and a product node, FOOTBALL TICKET, as its target.

In the above examples, customer classification was represented as one node in T, from which one "buys" relationship link to a product node could originate. In other situations, however, the description of a class of customers may not fit so neatly into the tree hierarchy T, as there might be a mismatch between this particular class of customers and the order of dimensions in T. Consider, for example, "People with children invest in Education IRAs." Even older people may have children, and people may also invest in IRAs for their grandchildren, so no single age bracket may apply here. To capture this class of customers, one may refer to 30 leaf nodes in the tree hierarchy T, given that the dimension considering children is at the lowest level in T. Furthermore, each of those nodes will require a "buys" relationship to an EDUCATION IRA node in a product, hierarchy. That is, in the present example, the marketing knowledge, "People with children invest in Education IRAs," expressed in a short sentence, may correspond to 30 links in the exemplary marketing ontology, which may be less economical than possible.

However, there is no inherent reason to choose, for example, the distinction between MAN and WOMAN at the second level, above all the other dimensions. If, for example, the children status dimension had been chosen as the top-level dimension in the hierarchy, then one node and one "buys" link would have been sufficient to represent the exemplary customer class discussed above and the associated marketing knowledge. Hence, for every ordering of the dimensions, the hierarchy may be well-matched to some customer classes but ill-fitting for others.

Another drawback to the above representation is the explosion of the total number of nodes. The number of just the leaves in T is the product of the numbers of options for all dimensions. In the above tree hierarchy T of only four dimensions, each with few choices, there are 60 leaves. However, in the example of market research, practitioners may wish to use many more dimensions. For example, some marketing researchers have used ten dimensions for customer classification. Because any combination of dimensions may appear in a customer classification, the tree hierarchy must be fully developed by expanding all dimensions.

The second problem with ordered dimensions is related to the repetition of nodes. Whole subtrees are repeated over and over. For example, in the above example T, the subtree with the marital choices was repeated for every age group. If a marketing executive wanted to add a marital status "WIDOWED", then this update would have to be performed in every subtree, leading to the further danger of inconsistencies (update anomalies).

As noted above, the difficulties encountered in designing a tree hierarchy customer ontology that is well-matched to representing many different forms of marketing knowledge stem from the concept that there may be no preferred order of the various dimensions. One may avoid this pitfall by not prioritizing the dimensions, and one may further apply such distinctions for all dimensions only on demand, i.e., on an as-needed basis. One may refer to a result of consistently applying such distinctions for all dimensions an on-demand intersection ontology.

As noted above, marketing knowledge may be represented, e.g., by "buy" links between a customer hierarchy and a product hierarchy, and most of the above discussion has centered on the example of the customer hierarchy. However, similar observations may also apply to a product hierarchy. That is, one may encounter some dimensions without a natural priority between them in the product hierarchy. FIG. 3 demonstrates an example of this situation between the location dimension (indoor, outdoor) and the operating mode dimension (electric, non-electric) of toys. However, the situation in the product hierarchy may, on the other hand, differ from that of the customer hierarchy, where dimensions may be mutually independent. For example, in the marketing field, there is an established practice (e.g., in stores, catalogs, etc.) of considering some dimensions of product classification prior to others. For example, Men's Wear and Women's Wear may typically be found in different departments, and perhaps even on different floors of a department store. Each of these may be further partitioned into various kinds of clothing, shoes, accessories etc. Furthermore, customers are used to this ordering of products and search accordingly for what they desire. Hence, while in the customer hierarchy, all dimensions may be independent, some dimensions without natural priority between them may exist for products. To handle these cases of independent dimensions for products, one may, for example, use intersections only for the mutually independent dimensions (which, as noted, may be relatively few). The balance of this discussion, we will continue to concentrate mainly on the example of a customer hierarchy.

Figure 4:
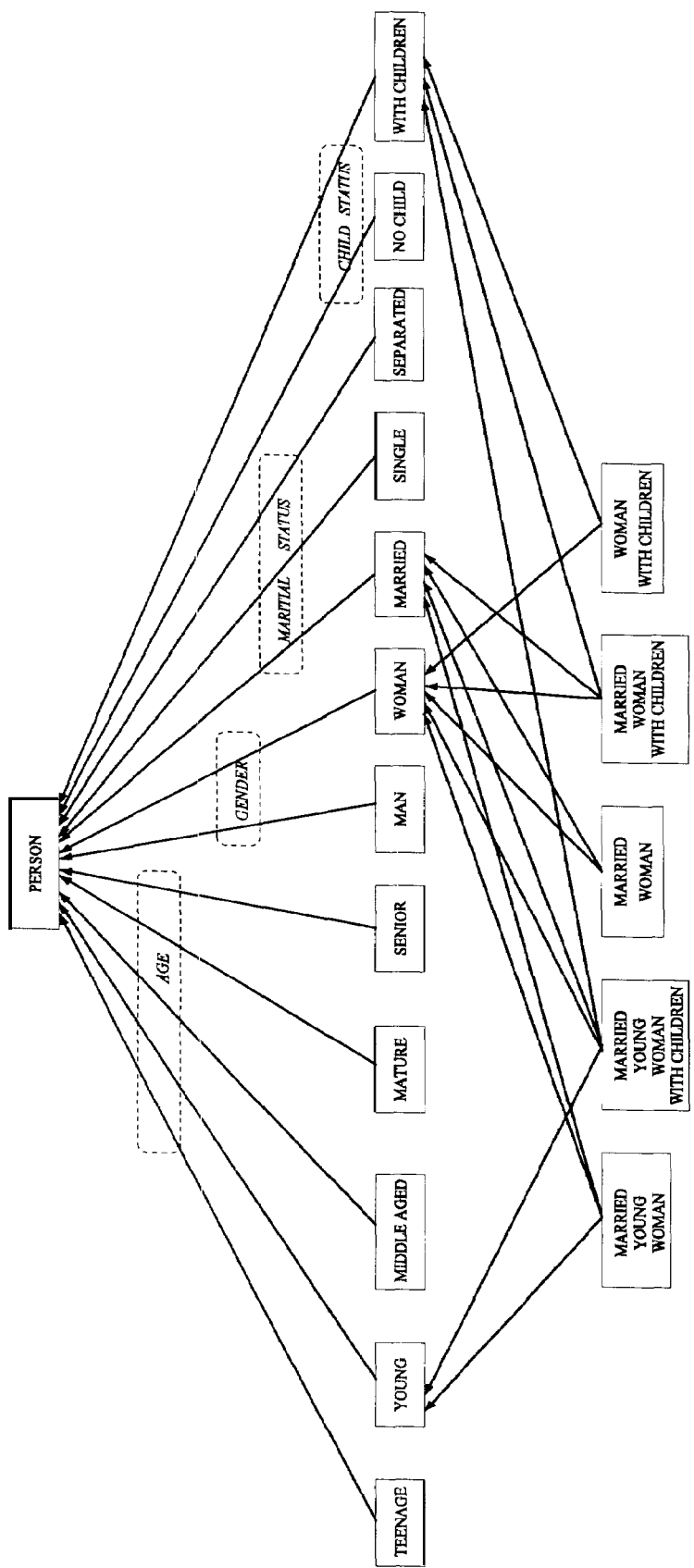
FIG. 4 shows a conceptual example of an application of a three-level intersection ontology to a set of data, according to an embodiment of the invention.

FIG. 4 shows an exemplary customer hierarchy represented according to an embodiment of the invention. The customer intersection hierarchy of FIG. 4 is shown with a unique root node representing the concept PERSON (i.e., the entire set of customers). Each option of each dimension may then be represented as a child of the root node at the second level of the hierarchy, as shown in FIG. 4. One may call such a node an option node. For example, FIG. 4 shows the WOMAN option node and the MARRIED option node.

The next question is how to represent a customer classification involving several dimensions. For example, the classification, MARRIED WOMAN WITH CHILDREN, involves three dimensions: gender, marital status and children status. One may do this by defining in the hierarchy a new kind of node that represents a combination of several options, one option for each of several dimensions (as shown in FIG. 4). For example, a MARRIED WOMAN node represents the combination of the option, WOMAN, for the gender dimension and the MARRIED option for the marital status dimension. Another node represents WOMAN WITH CHILDREN, a combination of options for gender and children status. The more complicated classification MARRIED WOMAN WITH CHILDREN represents a combination of options for three dimensions: WOMAN for gender, MARRIED for marital status and WITH CHILDREN for children status.

One may refer to a node that represents a combination of options of various dimensions an intersection node. That is, each intersection node may be used to represent the classification of a set of customers that is a mathematical intersection of several sets of customers, each with a one-dimensional classification. For example, the set of MARRIED WOMAN is the intersection of two sets MARRIED and WOMAN.

Note that the representation of FIG. 4 may provide a more economical representation of the classifications discussed in the immediately preceding paragraphs than the tree hierarchy representation discussed earlier, where neither of the classifications mentioned above in this section corresponds to a single node. For instance, MARRIED WOMAN WITH CHILDREN needs to be represented by several nodes in the tree hierarchy T because the AGE dimension is not mentioned in this classification. In T, AGE is the second dimension, and both MARRIED and WITH CHILDREN are below AGE in the hierarchy. Thus, to incorporate MARRIED, all AGE choices are included, too. As a result, five nodes of T are needed, due to the five options of the AGE dimension. Each of these nodes will have a link to DOLL, to capture the marketing knowledge, "Married women with children buy dolls," represented by one link in FIG. 2. Hence T is not an economical representation of this marketing knowledge.

As another example, fifteen nodes are needed to represent WOMAN WITH CHILDREN in T. This number corresponds to the multiplication of the number of options for the AGE and MARITAL STATUS dimensions, both not mentioned in this classification. Again, fifteen links will be needed to represent the marketing knowledge, "Women with children buy toys," represented by one link in FIG. 2.

Option nodes may have attributes and relationships. Intersection nodes may inherit these properties from all their parents, enabling multiple inheritance of properties. The root node and option nodes may also be sources in "buys" relationships.

At first glance it might appear that with intersection nodes one may end up generating hierarchies that are even larger than with ordered dimensions, as there may be a large number of nodes already at the second level. However, by using the on-demand technique, noted above, the opposite may often be the case. That is, only nodes that represent a combination of dimensions needed for the marketing knowledge in the particular application may be represented in the hierarchy. Therefore, if no marketing knowledge about a specific combination of dimensions exists, then one need not create an intersection node for this combination. In contrast, in the ordered dimension representation, a node that is not a leaf cannot be omitted from the tree hierarchy, even if no marketing knowledge is available regarding this node, because marketing knowledge may exist about any of its descendants.

For purposes of comparing ontologies, it may be convenient to define a concept of size. The size of an ontology is a pair (a, b) where a is the number of nodes and b is the number of relationships For instance, using this definition, the size of the ontology of FIG. 4 is (18, 26).

According to one embodiment of the invention, a network of an intersection ontology may connect all nodes in the hierarchy. The term, "three-level intersection ontology" will be used to denote a network satisfying the following conditions:
1. Each intersection node is connected directly to option nodes; and
2. The data set represented by the intersection node is a subset of the data set corresponding to each option node to which it is connected.

Consider an intersection node that represents the concept of a combination of k options $O_{i1}, O_{i2}, \ldots, O_{ik}$, one for each of the corresponding k dimensions ($k \leq n$) of the n existing dimensions. Such a concept (node) is more specific than (a child of) each of the option concepts (nodes) that represents one of the options $O_{ij}$, $1 \leq j \leq k$, since the set of customers that satisfy all the options $O_{i1}, O_{i2}, \ldots, O_{ik}$ simultaneously is a subset of each of the customer sets that satisfies one option $O_{ij}$, where $1 \leq j \leq k$.

In the three-level intersection hierarchy, each intersection node is at the third level, since all of its k option parents are at the second level. FIG. 4 shows an example of a three-level customer hierarchy.

The hierarchy of FIG. 4 may, however, be further refined to create a representation that may be even more efficient. In particular, FIG. 5 shows an embodiment of a multi-level intersection hierarchy that allows expressing parent-child relationships between two intersection nodes when one represents a more specific concept than the other.

Note that in the three-level hierarchy of FIG. 4, MARRIED WOMAN WITH CHILDREN may be formed by intersecting the option nodes MARRIED, WITH CHILDREN, and WOMAN, which may create redundancy if, as shown, for example, WOMAN WITH CHILDREN and MARRIED WOMAN are also desired. FIG. 5 shows that WOMAN WITH CHILDREN may be formed by intersecting WOMAN with CHILDREN, and MARRIED WOMAN may be formed by intersecting MARRIED with WOMAN, and finally, MARRIED WOMAN WITH CHILDREN may be formed by intersecting WOMAN WITH CHILDREN with MARRIED WOMAN.

Figure 5:
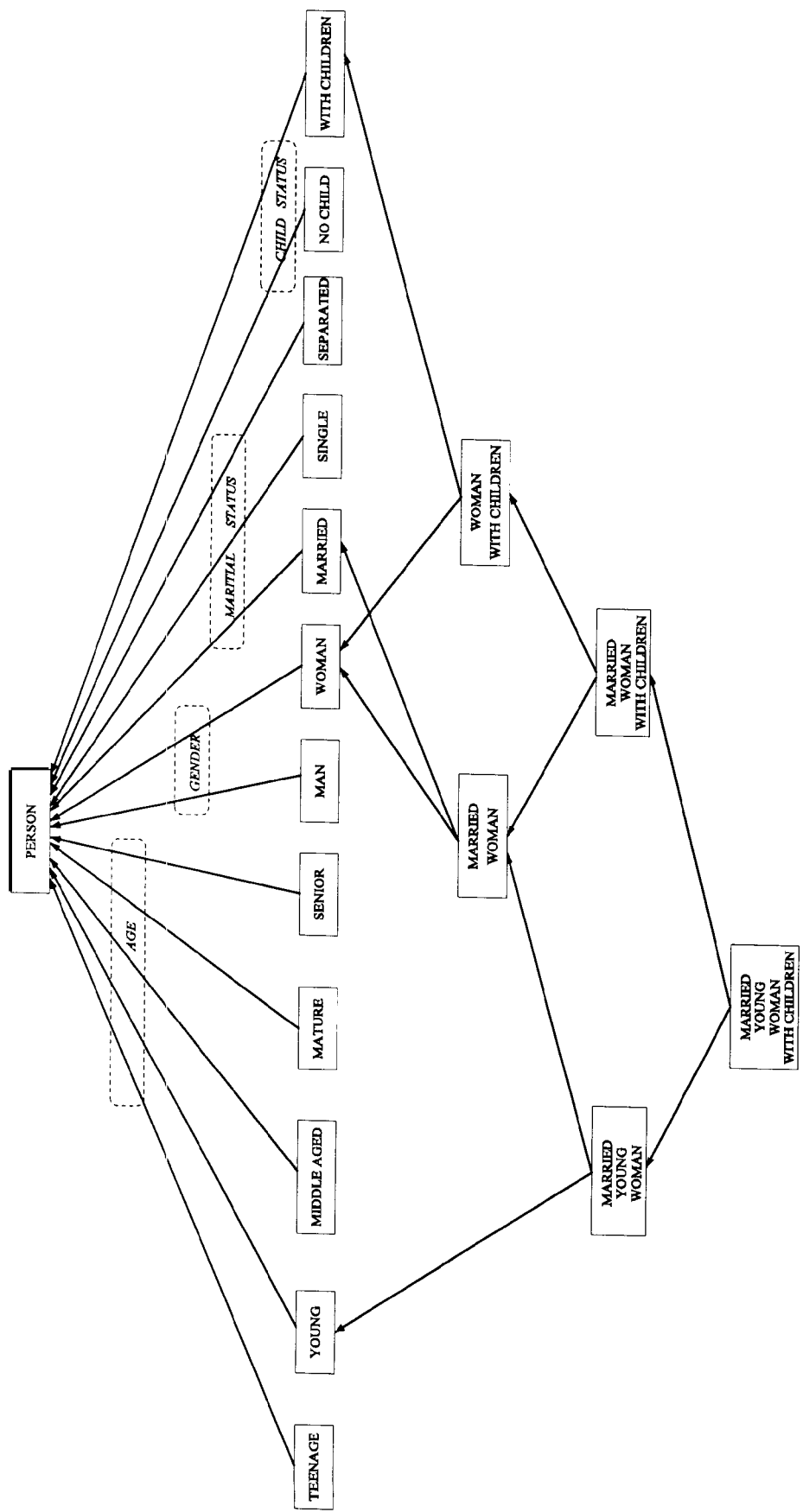
FIG. 5 shows a conceptual example of an application of a multi-level intersection ontology to a set of data, according to another embodiment of the invention.

Note that FIG. 5 has five levels. The number of explicit parent relationships in FIG. 5 is 22, versus 26 such relationships in FIG. 4. Both figures have 18 nodes. To aid in comparing such representations, it may be useful to have a definition of complexity of an ontology. In particular, the complexity C of an ontology of size (a, b) is defined here to be the ratio of the number of relationships (i.e., links) to the number of nodes; i.e., C=b/a.

Hence the three-level intersection ontology of FIG. 4 has size (18, 26) and complexity C=26/18=1.44. On the other hand, the multi-level intersection ontology of FIG. 5 has size (18, 22) and complexity C=22/18=1.22. In this example, the multi-level ontology has lower size and lower complexity in comparison with the corresponding three-level ontology.

For a further illustrative example, consider the example shown in FIGS. 6(a), 6(b), 7(a), 7(b), and 8. These correspond to representations of actual collected data, as will be described below.

In a particular web-based marketing project, 301,109 valid data records of (potential) customer information were collected. A record of information was considered valid if it had a valid e-mail address and at least one expressed interest. However, most people also provided more information, such as their age, gender and marital status. Regarding these as three dimensions for PERSON, one may construct a customer ontology and may show how the ordered dimensions tree hierarchy, the three-level intersection hierarchy, and the multi-level intersection hierarchy representations perform, respectively.

In the collected data, the dimensions of AGE, GENDER and MARITAL STATUS were considered to have six, two, and six options, respectively. However, some of the information was expressed in foreign characters, which was ignored. After filtering, there were 274,665 records. Each record was represented as an instance of a corresponding classification (node) in the ontology. However, some nodes contained fewer than 100 records. For marketing purposes, such may not represent useful information, and these were ignored for the purposes of this example.

Using the design of ordered dimensions, one may obtain the ontology shown in FIG. 6(a). The blank boxes stand for nodes without enough instances (fewer than 100 records) and were not created. In this figure, each node may be understood to represent a meaningful customer classification, from a marketing point of view, with the corresponding number of persons in our database. For instance, there were 23,709 records for males whose ages are between 10 and 19, and whose marital status is not specified.

Figure 7B:
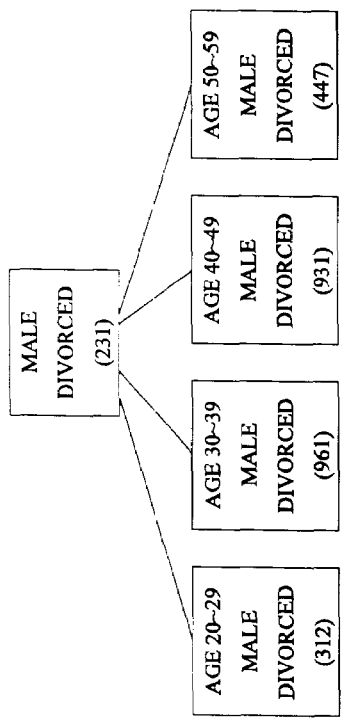
FIGS. 7(a) and 7(b) show conceptual examples of node collection samples that may be obtained from FIG. 6(b), according to an embodiment of the invention.
Figure 7A:
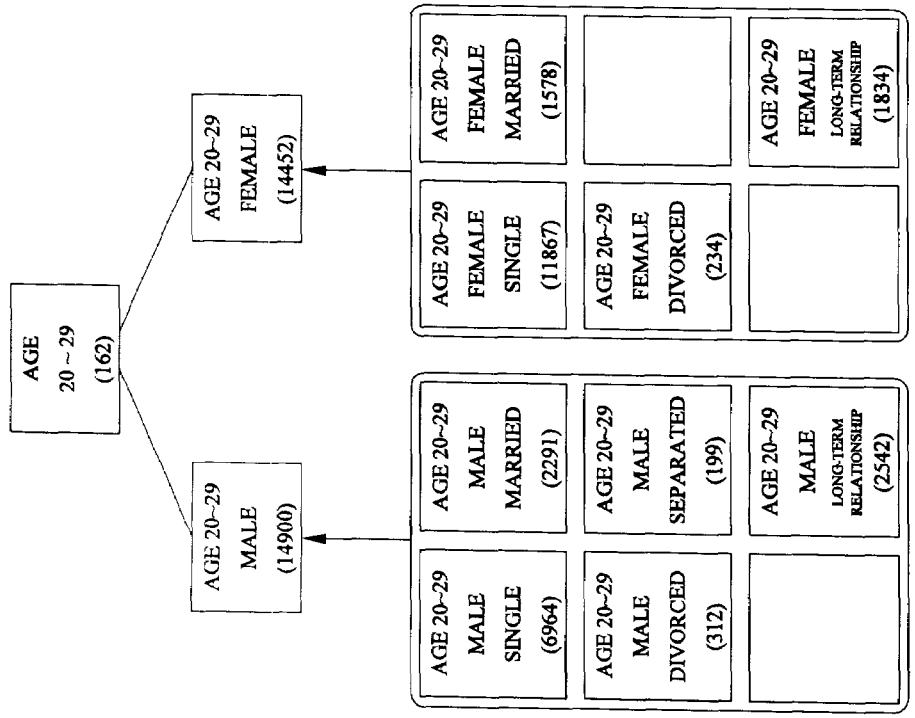

The tree hierarchy in FIG. 6(a) has 62 nodes and 61 IS-A links, and the visual complexity of 0.98. However, using this hierarchy, when trying to represent all the customer concepts with marketing knowledge, some of the concepts are not represented by a single node. To represent such a concept, multiple nodes, distributed in different parts of the hierarchy of FIG. 6(a), have to be collected. For example, due to the order of the dimensions, to represent the concept AGE 20-29, eleven nodes, structured in two sub-trees in FIG. 6(a), are needed, as shown in FIG. 7(a). Moreover, to represent the concept MALE and DIVORCED, four nodes may need to be collected, as shown in FIG. 7(b).

The number of possible concepts with one dimension is 2+6+6=14 and with two dimensions is 2×64+2×6+6×6=60. Hence the number of possible concepts with one or two dimensions is 74. (The concepts with three dimensions are not considered because they are properly represented in FIG. 6(a) by a single node leaf.) Among those 74 concepts, 14 can be found in levels 2 and 3 in FIG. 6(a) as corresponding single nodes. Because 48 of them do not have enough instances, there are 74−14−48=12 concepts that are not represented by a single node. FIG. 6(b) summarizes those twelve concepts needed in addition to FIG. 6(a) to represent every needed marketing knowledge concept. Every one of these twelve concepts needs to be represented by a group of nodes, distributed in various parts of FIG. 6(a), shown as its children as in FIGS. 7(a) and 7(b). For each concept in FIG. 6(b), the number of these nodes is listed, adding up to 76 nodes. Note that FIGS. 7(a) and 7(b) show only the expansions of the first node and the sixth node in FIG. 6(b), respectively. Thus, the number of nodes representing all the relevant concepts in the customer tree hierarchy are, for this particular example, 62+76=138.

Figure 8:
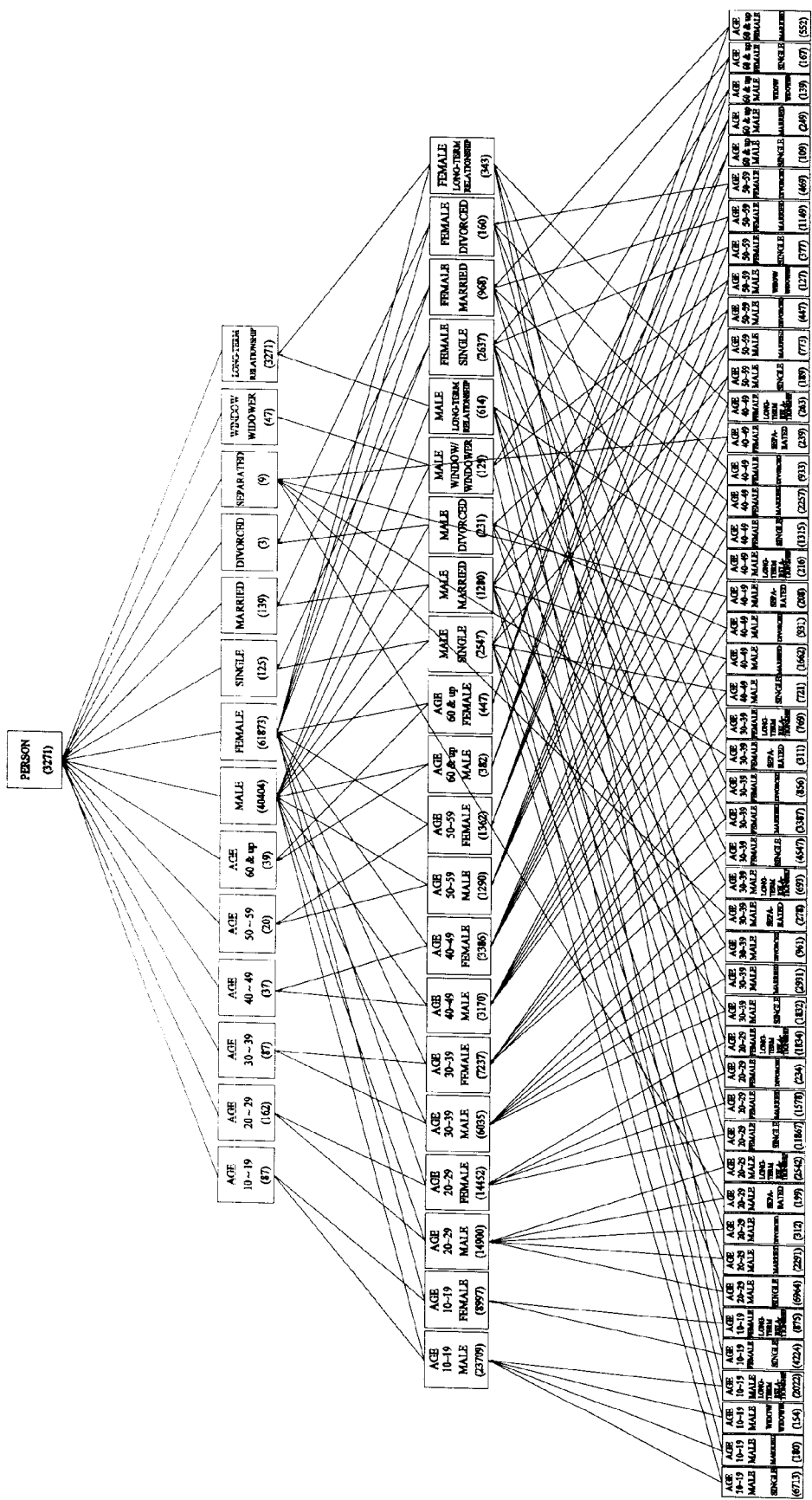
FIG. 8 shows a conceptual example of an application of a multi-level intersection ontology to a set of data, drawing upon the example shown in FIGS. 6(a) and 6(b), according to an embodiment of the invention.

In the design of the multi-level intersection hierarchy, one may obtain the ontology hierarchy in FIG. 8. There are fourteen option nodes. The third level shows twenty-one intersection nodes, each of which has two IS-A links to option nodes. The fourth level has 47 intersection nodes combining three dimensions. Out of 72 possible intersection nodes, twenty-five contain fewer than 100 records and are not represented. Thus, this design has −14+21+47=83 nodes and 150 IS-A links. The visual complexity of the multi-level intersection hierarchy is 150/83=1.81.

For the three-level intersection hierarchy, the figure is too large to be shown. However, the figure is a modification of FIG. 8 for the multi-level intersection hierarchy. The difference is that all the 47 nodes in the fourth level are moved to level 3 and are directly connected to the option nodes. Thus, there may be 68 intersection nodes at level 3. The total nodes number again is 83, but the number of IS-A links is 197. The extra 47 IS-A links are due to each of the 47 nodes having three IS-A links. The visual complexity is 197/83=2.37.

In summary, the usage of intersection nodes insures that every relevant customer concept may be represented by one single node in the hierarchy. The three-level and multi-level intersection hierarchy have the same number of nodes. However, the multi-level intersection hierarchy may have fewer links and lower visual complexity than the three-level intersection hierarchy. As reflected by the discussion above, the difference may be explained in the way that the intersection nodes are linked/formed through IS-A links.

To summarize this difference, in a three-level intersection ontology, each intersection node is directly linked to the option nodes from which it is derived. In a multi-level intersection ontology, IS-A links are permitted between intersection nodes, and this may be used to provide an economical representation by eliminating IS-A links that are implied by existing IS-A links by transitivity (for example, MARRIED WOMAN WITH CHILDREN is a subset of MARRIED WOMAN, so, for example, in FIG. 5, where MARRIED WOMAN already exists, there is no need to form an IS-A link from MARRIED WOMAN WITH CHILDREN to MARRIED, because this is IS-A relationship is implied by transitivity from existing IS-A links).

As noted above, the discussion is given here for use in marketing applications, however, the invention should not be understood as being thus limited. As mentioned above, other fields of application may include, for example, bioinformatics, computer-aided diagnosis, environmental studies, and census data. For example, in bioinformatics, an ontological hierarchy may be built based on people having different characteristics (e.g., age, race, genetic factors, etc.), and the nodes of this hierarchy may be linked to a hierarchy of possible treatments. Similarly, in computer-aided diagnosis, people may be classified according to various symptoms and/or other characteristics, and the nodes may be linked to a hierarchy of possible diagnoses. In an environmental study, a hierarchy may be formed of different organisms of different characteristics/conditions and linked to a hierarchy of environmental factors (e.g., pollutants). Census data may similarly be used to create hierarchies of people and associate the various nodes with various other hierarchies. However, the invention should not be understood as being limited merely to these examples.

Furthermore, the above discussion focuses on ontologies having a unique root. However, an ontology may be built off of multiple roots and thus not have a unifying unique root or an explicit unique root. An example of this would be to consider each option node (e.g., in FIG. 4 or FIG. 5) as a root. Such a multi-rooted ontology, without a unique root node unifying all of the option nodes, may still be considered as a single ontology. Thus, one may also have such a "topless" intersection ontology, according to some embodiments of the invention.

Figure 9:
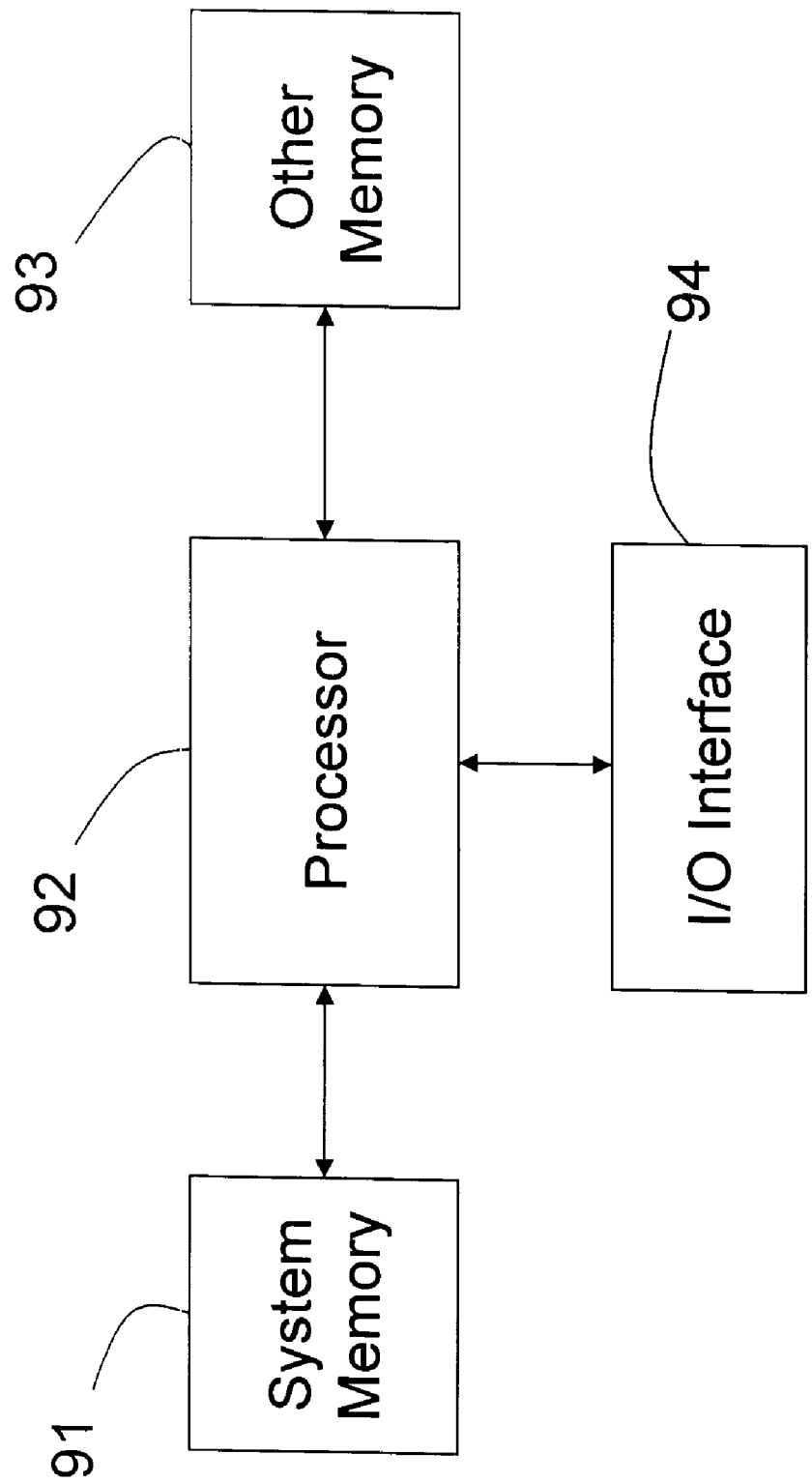
FIG. 9 shows a conceptual block diagram of a computer system that may be used to implement some embodiments of the invention.

FIG. 9 shows a conceptual block diagram of a system that may be used to implement all or part of various embodiments of the invention. Such a computing system may include one or more processors 92, which may be coupled to one or more system memories 91. Such system memory 91 may include, for example, RAM, ROM, or other such processor-readable media, and system memory 91 may be used to incorporate, for example, a basic I/O system (BIOS), operating system, instructions for execution by processor 92, etc. The system may also include further memory 93, such as additional RAM, ROM, hard disk drives, or other processor-readable media. Processor 92 may also be coupled to at least one input/output (I/O) interface 94. I/O interface 94 may include one or more user interfaces, as well as readers for various types of storage media and/or connections to one or more communication networks (e.g., communication interfaces and/or modems), from which, for example, software code may be obtained.

Various embodiments of the invention have now been discussed in detail; however, the invention should not be understood as being limited to these embodiments. It should also be appreciated that various modifications, adaptations, and alternative embodiments thereof may be made within the scope and spirit of the present invention. Consequently, the scope of the invention should be defined by the attached claims.

What is claimed is:

1. A method of organizing a set of data the method comprising:

applying, in a computing system, each of a plurality of classification types associated with a particular data analysis application, wherein each classification type comprises two or more options, to said set of data to form a plurality of option nodes, each representing a first subset of said set of data having a respective particular option associated with one of said classification types, wherein said set of data is associated with subjects to be studied by the data analysis application, wherein the data analysis application is to provide one or more characteristics of the subjects; and creating, in the computing system, one or more second subsets of said set of data according to one or more requirements associated with said data analysis application, said creating including representing at least one second subset as an intersection node representing an intersection of two or more of said option nodes, wherein each of said two or more of said option nodes corresponds to a different one of said classification types.

2. The method according to claim 1, wherein each said second subset is represented as an intersection selected from the group consisting of:

an intersection of two or more option nodes;
an intersection of one or more option nodes and one or more previously-formed second subsets; and
an intersection of two or more previously-formed second subsets.

3. The method according to claim 1, further comprising:
associating each second subset with at least one item from a second set of data.

4. The method according to claim 3, wherein said at least one item corresponds to a subset of said second set of data in a hierarchy of said second set of data.

5. The method according to claim 4, further comprising creating said hierarchy of said second set of data, wherein said creating said hierarchy includes:

applying each of a plurality of second classification types to said second set of data to form a plurality of second option nodes, each representing a first subset of said second set of data having a respective particular option associated with one of said second classification types; and creating one or more further subsets of said second set of data according to one or more requirements associated with said data analysis application, said creating including representing at least one further subset as an intersection of two or more of said second option nodes, wherein each of said two or more of said second option nodes corresponds to a different one of said second classification types.

6. The method according to claim 3, further comprising:
outputting data reflecting associations between said further subsets and one or more items of data from said second set of data.

7. The method according to claim 1, further comprising:
receiving input from a user to define said requirements.

8. The method according to claim 1, wherein said data analysis application is adapted to provide data relevant to a field selected from the group consisting of:
marketing, bioinformatics, computer-aided diagnosis, ecology, and a census.

9. The method according to claim 1, further comprising downloading machine-executable instructions that, if executed by a processor, cause the processor to implement said applying each of said classification types and said creating one or more second subsets.

10. The method according to claim 9, wherein each said second subset is represented as an intersection selected from the group consisting of:

an intersection of two or more option nodes;
an intersection of one or more option nodes and one or more previously-formed second subsets; and
an intersection of two or more previously-formed second subsets.

11. The method according to claim 9, wherein the machine-executable instructions, if executed by the processor, further cause the processor to implement
associating each second subset with at least one item from a second set of data.

12. The method according to claim 11, wherein said at least one item corresponds to a subset of said second set of data in a hierarchy of said second set of data.

13. The method according to claim 12, wherein the machine-executable instructions, if executed by the processor, further cause the processor to implement creating said hierarchy of said second set of data, wherein creating said hierarchy includes:

applying each of a plurality of second classification types to said second set of data to form a plurality of second option nodes, each representing a first subset of said second set of data having a respective particular option associated with one of said second classification types; and creating one or more further subsets of said second set of data according to one or more requirements associated with said data analysis application, said creating including representing at least one further subset as an intersection of two or more of said second option nodes, wherein each of said two or more of said second option nodes corresponds to a different one of said second classification types.

14. The method according to claim 12, wherein the machine-executable instructions, if executed by the processor, further cause the processor to implement
outputting data reflecting associations between said further subsets and one or more items of data from said second set of data.

15. The method according to claim 9, wherein the machine-executable instructions, if executed by the processor, further cause the processor to implement
receiving input from a user to define said requirements.

16. The method according to claim 9, wherein said data analysis application is adapted to provide data related to a field selected from the group consisting of:
marketing, bioinformatics, computer-aided diagnosis, ecology, and a census.

17. The method according to claim 1, further comprising offering for downloading machine-executable instructions that, if executed by a processor, cause the processor to implement said applying each of said classification types and said creating one or more second subsets.

18. A machine-readable medium containing machine-executable instructions that, if executed by a processor, cause the processor to implement a method of organizing a set of data, the method comprising:

applying, in a computing system, each of a plurality of classification types associated with a particular data analysis application, wherein each classification type comprises two or more options, to said set of data to form a plurality of option nodes, each representing a first subset of said set of data having a respective particular option associated with one of said classification types, wherein said set of data is associated with subjects to be studied by the data analysis application, wherein the data analysis application is to provide one or more characteristics of the subjects; and creating, in the computing system, one or more second subsets of said set of data according to one or more requirements associated with said application, said creating including representing at least one second subset as an intersection node representing an intersection of two or more of said option nodes, wherein each of said two or more of said option nodes corresponds to a different one of said classification types.

19. The medium according to claim 18, wherein each said second subset is represented as an intersection selected from the group consisting of:
an intersection of two or more option nodes;
an intersection of one or more option nodes and one or more previously-formed second subsets; and
an intersection of two or more previously-formed second subsets.

20. The medium according to claim 18, further comprising additional machine-executable instructions that, if executed by said processor, cause the method implemented by the processor to further comprise:
associating each second subset with at least one item from a second set of data.

21. The medium according to claim 20, wherein said at least one item corresponds to a subset of said second set of data in a hierarchy of said second set of data.

22. The medium according to claim 21, further comprising additional machine-executable instructions that, if executed by said processor, cause the method implemented by the processor to further comprise creating said hierarchy of said second set of data, wherein creating said hierarchy includes:
applying each of a plurality of second classification types to said second set of data to form a plurality of second option nodes, each representing a first subset of said second set of data having a respective particular option associated with one of said second classification types; and
creating one or more further subsets of said second set of data according to one or more requirements associated with said data analysis application, said creating including representing at least one further subset as an intersection of two or more of said second option nodes, wherein each of said two or more of said second option nodes corresponds to a different one of said second classification types.

23. The medium according to claim 20, further comprising additional machine-executable instructions that, if executed by said processor, cause the method implemented by the processor to further comprise:
outputting data reflecting associations between said subclasses and one or more items of data from said second set of data.

24. The medium according to claim 18, further comprising additional machine-executable instructions that, if executed by said processor, cause the method implemented by the processor to further comprise:
receiving input from a user to define said requirements.

25. The medium according to claim 18, wherein said data analysis application is adapted to provide data applicable to an area selected from the group consisting of:
marketing, bioinformatics, computer-aided diagnosis, ecology, and a census.

26. The medium according to claim 25, wherein said data analysis application is directed to extracting marketing data from said set of data, wherein said set of data represents a set of customers, and wherein said second set of data represents a set of products.

27. The medium according to claim 26, wherein said classification types correspond to customer demographics.

28. A computer system, comprising:
at least one processor;
a memory to store a set of data associated with subjects to be studied using a data analysis application; and
a user interface to communicate with a user;
wherein the computer system is adapted to execute a method of organizing said set of data for use in a particular application using a plurality of classification types, with each classification type having at least two options, the method comprising:
applying each of a plurality of classification types associated with the data analysis application, wherein each classification type comprises two or more options, to said set of data to form a plurality of option nodes, each representing a first subset of said set of data having a respective particular option associated with one of said classification types, wherein the data analysis application is to provide one or more characteristics of the subjects; and
creating one or more second subsets of said set of data according to one or more requirements associated with said data analysis application, said creating including representing at least one second subset as an intersection node representing an intersection of two or more of said option nodes, wherein each of said two or more of said option nodes corresponds to a different one of said classification types.

29. The system according to claim 28, wherein each said second subset is represented as an intersection selected from the group consisting of:
an intersection of two or more option nodes;
an intersection of one or more option nodes and one or more previously-formed second subsets; and
an intersection of two or more previously-formed second subsets.

30. The system according to claim 28, wherein said data analysis application is adapted to obtain data useful in a field of study selected from the group consisting of: marketing, bioinformatics, computer-aided diagnosis, ecology, and a census.

* * * * *

UNITED STATES PATENT AND TRADEMARK OFFICE
CERTIFICATE OF CORRECTION

PATENT NO. : 7,636,702 B2 Page 1 of 1
APPLICATION NO. : 11/556073
DATED : December 22, 2009
INVENTOR(S) : Perl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 447 days.

Signed and Sealed this

Twenty-first Day of December, 2010

David J. Kappos
*Director of the United States Patent and Trademark Office*